(12) United States Patent
Liao et al.

(10) Patent No.: US 11,577,805 B2
(45) Date of Patent: Feb. 14, 2023

(54) BICYCLE FRONT DERAILLEUR

(71) Applicant: TEKTRO TECHNOLOGY CORPORATION, Changhua County (TW)

(72) Inventors: Bo-Yi Liao, Changhua County (TW); Szu-Fang Tsai, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 284 days.

(21) Appl. No.: 17/088,026

(22) Filed: Nov. 3, 2020

(65) Prior Publication Data

US 2021/0163098 A1 Jun. 3, 2021

(30) Foreign Application Priority Data

Nov. 29, 2019 (TW) .................................. 108143775

(51) Int. Cl.
*B62M 9/1342* (2010.01)
*B62M 9/135* (2010.01)
*B62M 9/136* (2010.01)

(52) U.S. Cl.
CPC .......... *B62M 9/1342* (2013.01); *B62M 9/135* (2013.01); *B62M 9/136* (2013.01)

(58) Field of Classification Search
CPC .... B62M 9/136; B62M 9/1342; B62M 9/135; B62M 9/1344
USPC .................................................... 474/80, 82
See application file for complete search history.

(56) References Cited

U.S. PATENT DOCUMENTS

| | | | | |
|---|---|---|---|---|
| 4,199,997 A | * | 4/1980 | Isobe | B62M 25/02 474/82 |
| 4,199,998 A | * | 4/1980 | Isobe | B62M 9/135 474/82 |
| 4,675,952 A | * | 6/1987 | Nagano | B62M 9/135 74/489 |
| 6,270,124 B1 | * | 8/2001 | Nanko | B62M 9/135 24/274 WB |
| 7,306,531 B2 | * | 12/2007 | Ichida | B62M 25/08 474/70 |
| 7,331,890 B2 | * | 2/2008 | Ichida | B62M 9/132 474/80 |
| 7,341,532 B2 | * | 3/2008 | Ichida | B62M 9/132 474/70 |
| 7,704,172 B2 | * | 4/2010 | Tetsuka | B62M 9/135 474/82 |

(Continued)

*Primary Examiner* — Henry Y Liu
(74) *Attorney, Agent, or Firm* — Locke Lord LLP; Tim Tingkang Xia, Esq.

(57) ABSTRACT

The disclosure provides a bicycle front derailleur configured to be mounted on a bicycle frame. The bicycle front derailleur includes a fixed component, a chain guide, a linkage assembly, and an adjustment component. The fixed component is configured to be mounted on the bicycle frame. Two opposite ends of the linkage assembly are respectively and pivotably disposed on the fixed component and the chain guide. The adjustment component is pivotably disposed on the fixed component. The adjustment component is configured to press against the bicycle frame so as to adjust a position of the bicycle front derailleur with respect to the bicycle frame.

15 Claims, 6 Drawing Sheets

(56) References Cited

U.S. PATENT DOCUMENTS

| | | | | |
|---|---|---|---|---|
| 8,574,105 B2* | 11/2013 | Auer | | B62M 9/135 474/82 |
| 8,864,611 B2* | 10/2014 | Kuwayama | | B62M 9/135 474/82 |
| 9,156,525 B2* | 10/2015 | Emura | | B62M 9/1342 |
| 9,873,482 B2* | 1/2018 | Nishino | | B62M 9/135 |
| 10,259,531 B2* | 4/2019 | Keong | | B62M 9/135 |
| 11,192,607 B2* | 12/2021 | Fujimoto | | B62M 9/1342 |
| 11,440,621 B2* | 9/2022 | Komatsu | | B62J 45/20 |
| 2004/0185975 A1* | 9/2004 | Chen | | B62M 9/137 474/82 |
| 2005/0192139 A1* | 9/2005 | Ichida | | B62M 25/08 474/70 |
| 2005/0204846 A1* | 9/2005 | Valle | | B62M 9/135 74/469 |
| 2006/0189421 A1* | 8/2006 | Ichida | | B62M 9/132 474/82 |
| 2007/0117666 A1* | 5/2007 | Ichida | | B62M 9/135 474/80 |
| 2012/0295745 A1* | 11/2012 | Emura | | B62M 9/1344 474/80 |
| 2013/0085024 A1* | 4/2013 | Inoue | | B62M 9/136 474/80 |
| 2014/0155204 A1* | 6/2014 | Emura | | B62M 9/135 474/80 |
| 2014/0155205 A1* | 6/2014 | Kuwayama | | B62M 9/135 474/80 |
| 2014/0287856 A1* | 9/2014 | Kuwayama | | B62M 9/132 474/80 |
| 2014/0315671 A1* | 10/2014 | Lazzarin | | B62M 9/134 474/80 |
| 2015/0018146 A1* | 1/2015 | Emura | | B62M 9/135 474/80 |
| 2015/0099599 A1* | 4/2015 | Lazzarin | | B62M 9/1342 474/80 |
| 2016/0068225 A1* | 3/2016 | Kuwayama | | B62M 9/1342 474/80 |

* cited by examiner

BICYCLE FRONT DERAILLEUR

CROSS-REFERENCE TO RELATED APPLICATIONS

This non-provisional application claims priority under 35 U.S.C. § 119(a) on Patent Application No(s). 108143775 filed in Taiwan, R.O.C. on Nov. 29, 2019, the entire contents of which are hereby incorporated by reference.

TECHNICAL FIELD

The disclosure relates to a bicycle front derailleur, more particularly to a bicycle front derailleur including an adjustment component that can slightly adjust the position of the bicycle front derailleur with respect to a bicycle frame.

BACKGROUND

A bicycle may equip with front and rear derailleurs in order to effect a desired speed change. The front derailleur is used for selectively shifting the drive chain from one chainring to another. The rear derailleur is used for selectively shifting the drive chain from one sprocket to another sprocket of the cassette. The combination of the selected chainring and sprocket by the front and rear derailleurs can determine the gear ratio that is needed by the cyclist.

A typical front derailleur is mounted on the seat tube of the bicycle frame and has a chain guide (front derailleur cage) that can used to shift the chain among the chainrings. It is known that the chain guide should run approximately parallel to the chainring to avoid chain run in cross gears. There are various kinds of seat tubes in the market, however, the conventional front derailleurs might not be suitable for the seat tubes of different sizes and shapes, which may result in misalignment of the chain guide to the chainrings and thus affecting the movement of the chain among the chainrings. Accordingly, the bicycle manufacturer is working on solving the aforementioned problems.

SUMMARY OF THE INVENTION

The disclosure provides a bicycle front derailleur that ensures a smooth shifting regardless of the size or shape of seat tube.

One embodiment of the disclosure provides a bicycle front derailleur configured to be mounted on a bicycle frame. The bicycle front derailleur includes a fixed component, a chain guide, a linkage assembly, and an adjustment component. The fixed component is configured to be mounted on the bicycle frame. Two opposite ends of the linkage assembly are respectively and pivotably disposed on the fixed component and the chain guide. The adjustment component is pivotably disposed on the fixed component. The adjustment component is configured to press against the bicycle frame so as to adjust a position of the bicycle front derailleur with respect to the bicycle frame.

Another embodiment of the disclosure provides a bicycle front derailleur configured to be mounted on a bicycle frame. The bicycle front derailleur includes a fixed component, a chain guide, a linkage assembly, an adjustment component, and an activating component. The fixed component is configured to be mounted on the bicycle frame. Two opposite ends of the linkage assembly are respectively and pivotably disposed on the fixed component and the chain guide. The adjustment component is pivotably disposed on the fixed component. The adjustment component is configured to press against the bicycle frame. The activating component is in contact with the adjustment component. The activating component is movable with respect to the fixed component to pivot the adjustment component in one of two different directions so as to adjust a position of the bicycle front derailleur with respect to the bicycle frame.

According to the bicycle front derailleurs as discussed above, the adjustment component is movably disposed on the fixed component, and the activating component can force the adjustment component to press against the bicycle frame, such that the bicycle front derailleur can be pivoted with respect to the bicycle frame so as to slightly adjust the position of the bicycle front derailleur, thereby ensuring a smooth shifting of a bicycle chain among chainrings.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
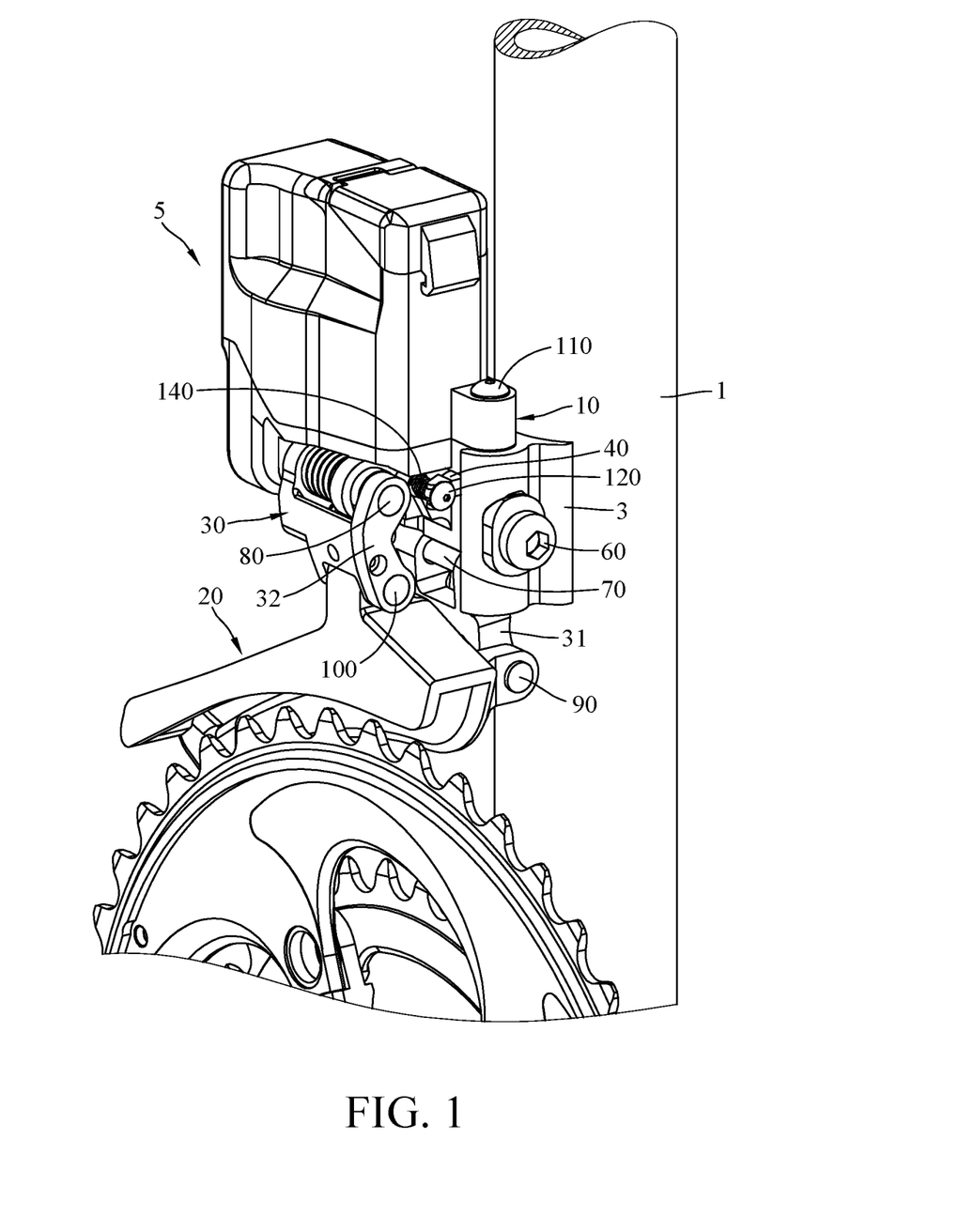
FIG. 1 is a perspective view of a bicycle front derailleur according to a first embodiment of the disclosure.
Figure 2:
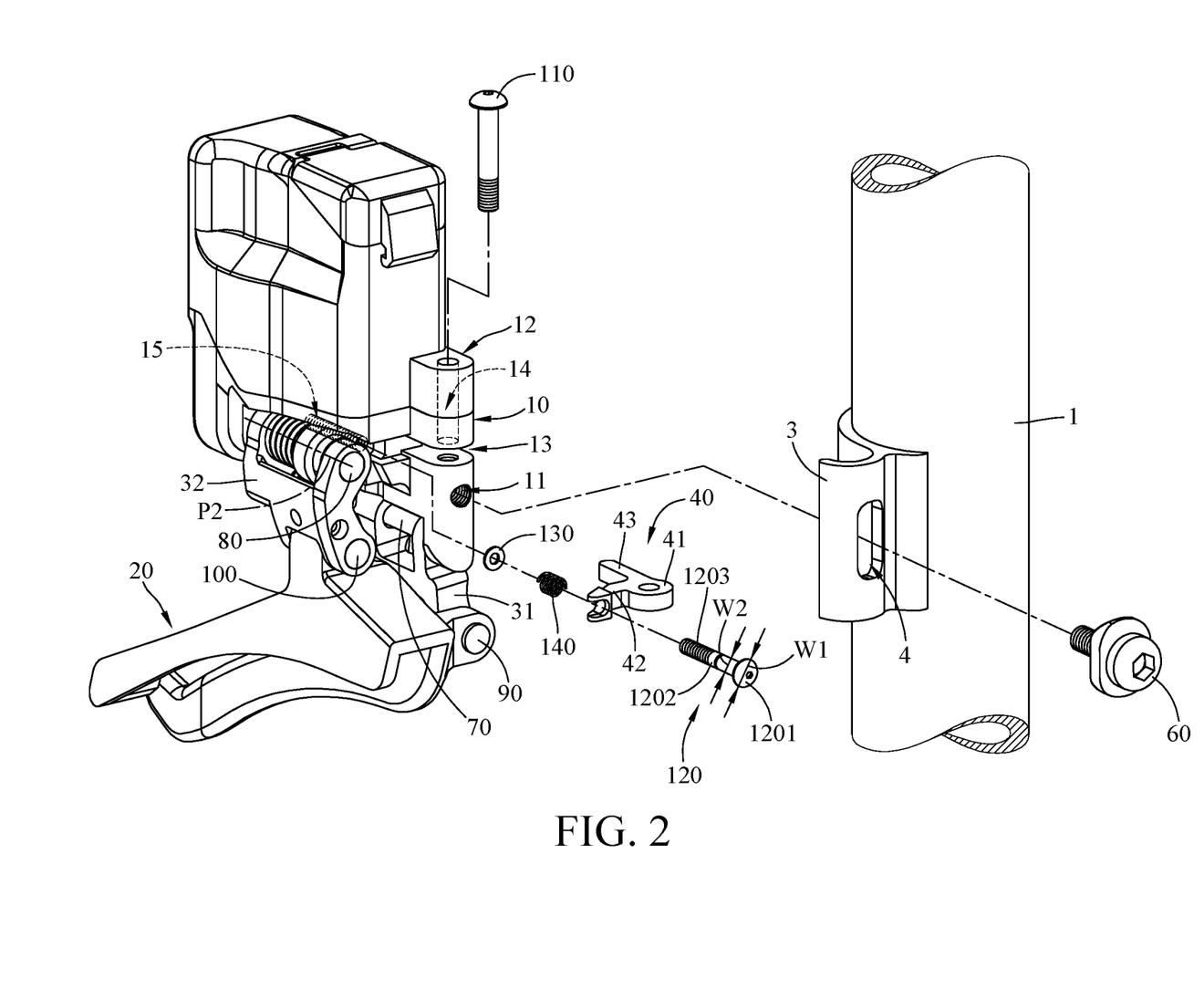
FIG. 2 is a partial exploded view of the bicycle front derailleur in FIG. 1.
Figure 3:
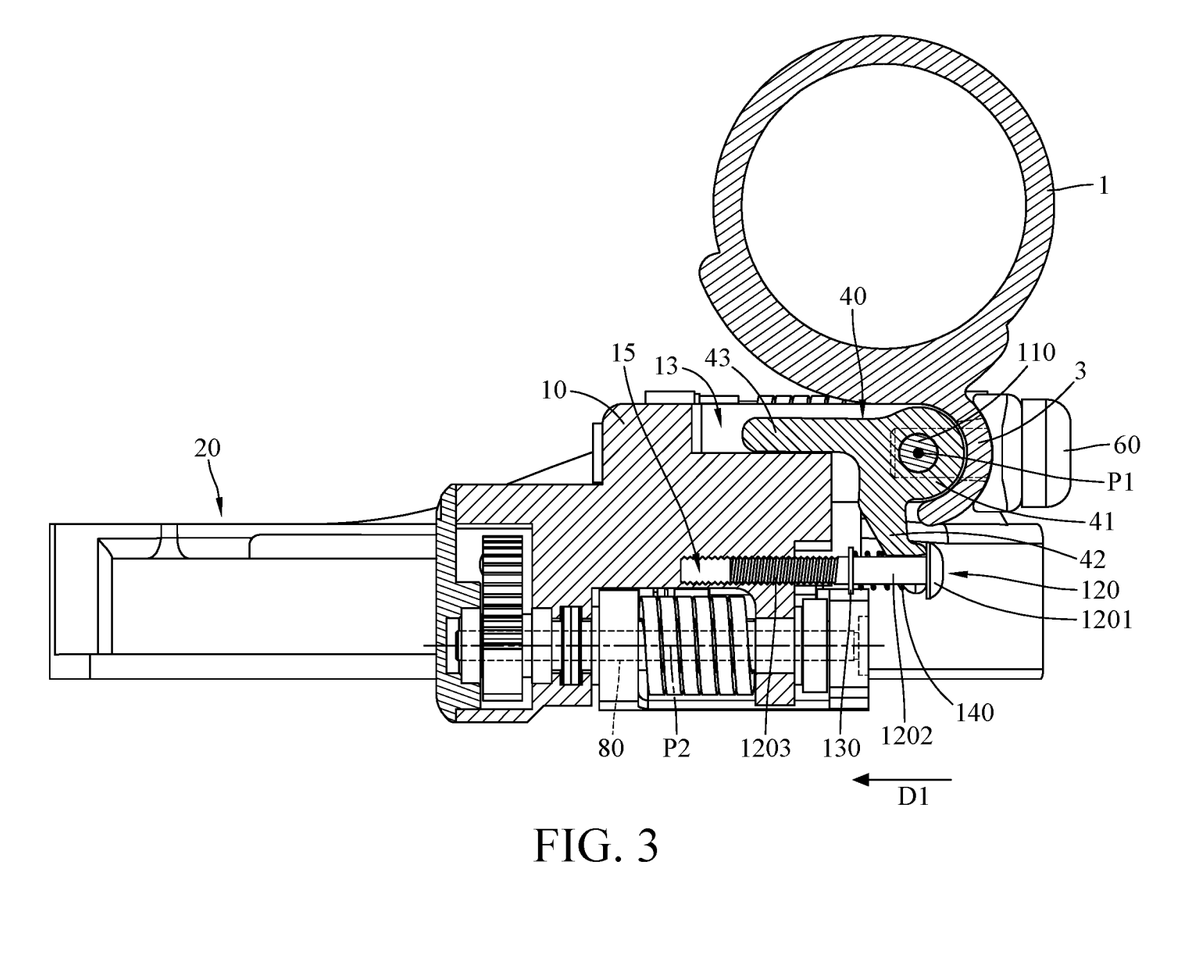
FIG. 3 is a cross-sectional view of the bicycle front derailleur in FIG. 1.

Referring to FIGS. 1 to 3, there are shown a perspective view of a bicycle front derailleur 5 according to a first embodiment of the disclosure, a partial exploded view of the bicycle front derailleur 5 in FIG. 1, and a cross-sectional view of the bicycle front derailleur 5 in FIG. 1.

In this embodiment, the bicycle front derailleur 5 is configured to be mounted on a seat tube of a bicycle frame 1 (hereinafter also called "frame 1"). The bicycle front derailleur 5 includes a fixed component 10, a chain guide 20, a linkage assembly 30, and an adjustment component 40. In this or another embodiment, the bicycle front derailleur 5 may further include a screw 60, a plurality of pivot pins 70, 80, 90, and 100, a fastener 110, an activating component 120, a stopper 130, and an elastic component 140.

The frame 1 has, for example, a mount portion 3. The mount portion 3 has a through hole 4. The fixed component 10 has, for example, a screw hole 11. The screw 60 is configured to be disposed through the through hole 4 of the mount portion 3 and screwed into the screw hole 11 of the fixed component 10 in order to fix the fixed component 10 to the frame 1.

The linkage assembly 30 includes a first link 31 and a second link 32. One end of the first link 31 is pivotably disposed on the fixed component 10 via the pivot pin 70, and one end of the second link 32 is pivotably disposed on the fixed component 10 via the pivot pin 80. When the fixed component 10 is mounted on the frame 1, the first link 31 is located closer to the frame 1 than the second link 32. The other end of the first link 31 located away from the fixed component 10 is pivotably disposed on the chain guide 20 via the pivot pin 90, and the other end of the second link 32 located away from the fixed component 10 is pivotably disposed on the chain guide 20 via the pivot pin 100. The pivot pins 70, 80, 90, and 100 has central axes parallel to one another; in other words, the pivot pins 70, 80, 90, and 100 are parallel to one another.

In this embodiment, the bicycle front derailleur 5 is, for example, an electronic derailleur. Specifically, the bicycle front derailleur 5 may further include a motor, a transmission assembly, a circuit board, and a battery. When the circuit board receives a shift signal, the circuit board can activate the motor to move the second link 32 of the linkage assembly 30 via the transmission assembly, and the movement of the second link 32 can move the chain guide 20 towards or away from the frame 1, thereby moving a bicycle chain from one chainring to another. Note that the bicycle front derailleur 5 is not restricted to be the electronic derailleur; in some other embodiments, the bicycle front derailleur may be a mechanical derailleur without signal transmission.

In this embodiment, the fixed component 10 may further have an inner surface 12, a recess 13, and a through hole 14. The inner surface 12 of the fixed component 10 is configured to face towards the frame 1. The recess 13 is formed on the inner surface 12. The through hole 14 extends in a direction perpendicular to the central axis P2 of the pivot pin 80. The through hole 14 is connected to the recess 13.

The adjustment component 40 includes a mount portion 41, a pushed portion 42, and a press portion 43. The pushed portion 42 is connected to the press portion 43 via the mount portion 41. The pushed portion 42 and the press portion 43 extend outwards in different directions from the mount portion 41. The mount portion 41 of the adjustment component 40 is located in the recess 13. The fastener 110 is, for example, a screw. The fastener 110 is disposed through the through hole 14 and the mount portion 41 of the adjustment component 40 and screwed into a screw hole of the fixed component 10, such that the adjustment component 40 is pivotably disposed on the fixed component 10, and the adjustment component 40 is pivotable with respect to the fixed component 10 about a pivot axis P1.

In this embodiment, the fixed component 10 further has a screw hole 15. The activating component 120 is, for example, a screw. The activating component 120 and the adjustment component 40 are two independent objects. The activating component 120 includes a head portion 1201 and a body portion 1202 connected to each other, and a width W1 of the head portion 1201 is larger than a width W2 of the body portion 1202. The body portion 1202 of the activating component 120 has outer threads 1203. The body portion 1202 of the activating component 120 is disposed through the push portion 42 of the adjustment component 40, and at least part of the outer threads 1203 of the body portion 1202 is screwed into the screw hole 15 of the fixed component 10. The head portion 1201 of the activating component 120 is in contact with the pushed portion 42 of the adjustment component 40. The stopper 130 is sleeved on the body portion 1202 of the activating component 120 and located at a side of the pushed portion 42 of the adjustment component 40 located away from the head portion 1201 of the activating component 120. The elastic component 140 is sleeved on the body portion 1202 of the activating component 120 and located at the side of the pushed portion 42 of the adjustment component 40 located away from the head portion 1201 of the activating component 120. Two opposite ends of the elastic component 140 respectively press against the stopper 130 and the pushed portion 42 of the adjustment component 40 so as to constantly force the pushed portion 42 to be in contact with the head portion 1201 of the activating component 120.

In this embodiment, the activating component 120 is movable with respect to the fixed component 10. In specific, as shown in FIG. 3, the cooperation of the outer threads 1203 of the body portion 1202 of the activating component 120 and the screw hole 15 of the fixed component 10 enables the movement of the activating component 120 in a direction D1 or a direction opposite the direction D1. As shown, both the moving directions (e.g., the direction D1 and the direction opposite the direction D1) of the activating component 120 are perpendicular to the pivot axis P1 of the adjustment component 40 and parallel to the central axis P2 of the pivot pin 80. Moreover, the moving directions of the activating component 120 are also parallel to the central axes of the pivot pins 70, 90, and 100.

Moving the activating component 120 along the direction D1 can force the adjustment component 40 to press against the frame 1 and therefore can change the position of the bicycle front derailleur 5 with respect to the frame 1. In detail, referring to FIG. 4, there is shown a cross-sectional view of the bicycle front derailleur 5 in FIG. 1 when the position of the bicycle front derailleur 5 has been adjusted.

Figure 4:
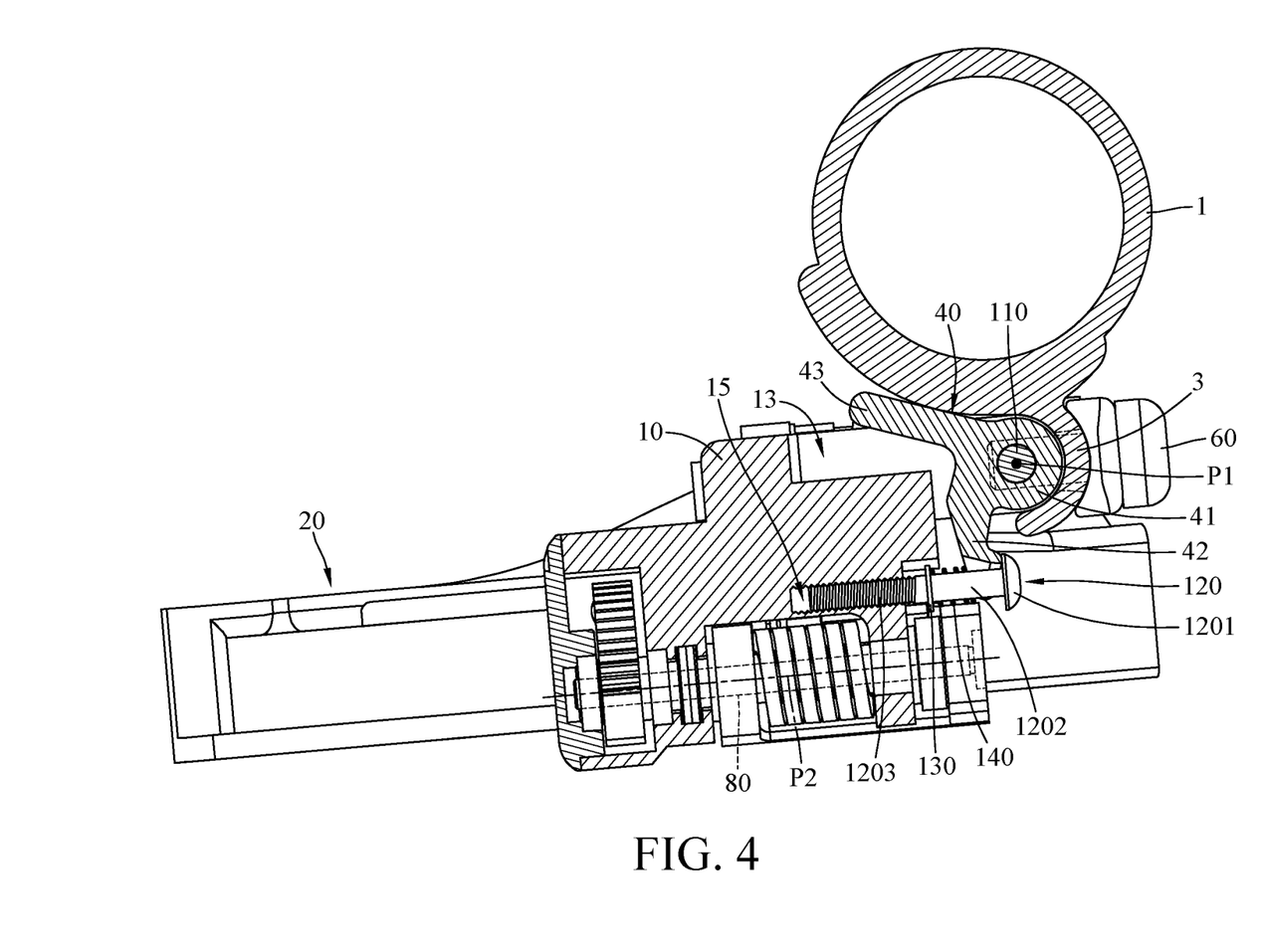
FIG. 4 is a cross-sectional view of the bicycle front derailleur in FIG. 1 when the position of the bicycle front derailleur has been adjusted.

When the activating component 120 is moved in the direction D1, the head portion 1201 of the activating component 120 pushes the pushed portion 42 of the adjustment component 40, and the elastic component 140 is compressed by the stopper 130 and the pushed portion 42 of the adjustment component 40. By doing so, the adjustment component 40 is pivoted with respect to the fixed component 10 about the axis P1 so as to cause the press portion 43 to stick out of the recess 13 of the fixed component 10 to press against the frame 1. At this moment, the activating component 120 is stopped by the pushed portion 42, thus when the activating component 120 is being screwed further into the screw hole 15, the force that the activating component 120 acts on the fixed component 10 can cause the bicycle front derailleur 5 to pivot about pivot axis P1 with respect to the frame 1. As such, the bicycle front derailleur 5 is changed a position that is suitable for performing a smooth shifting of the bicycle chain. That is, the bicycle front derailleur 5 is adjustable in position to ensure a smooth shifting of the bicycle chain among the chainrings regardless of the size of seat tube.

In addition, when the activating component 120 is screwed in the opposite direction so as to be gradually released from the screw hole 15, the activating component 120 can cause the press portion 43 of the adjustment component 40 to move towards the recess 13 of the fixed component 10 (e.g., along a counter-clockwise direction in FIG. 4) via the stopper 130 and the elastic component 140, such that the angle of the adjustment component 40 to the frame 1 can be adjusted, and the angle of the bicycle front derailleur 5 to the frame 1 can be reduced. In short, the position of the bicycle front derailleur 5 with respect to the frame 1 can be precisely adjusted by moving the activating component 120.

Figure 5:
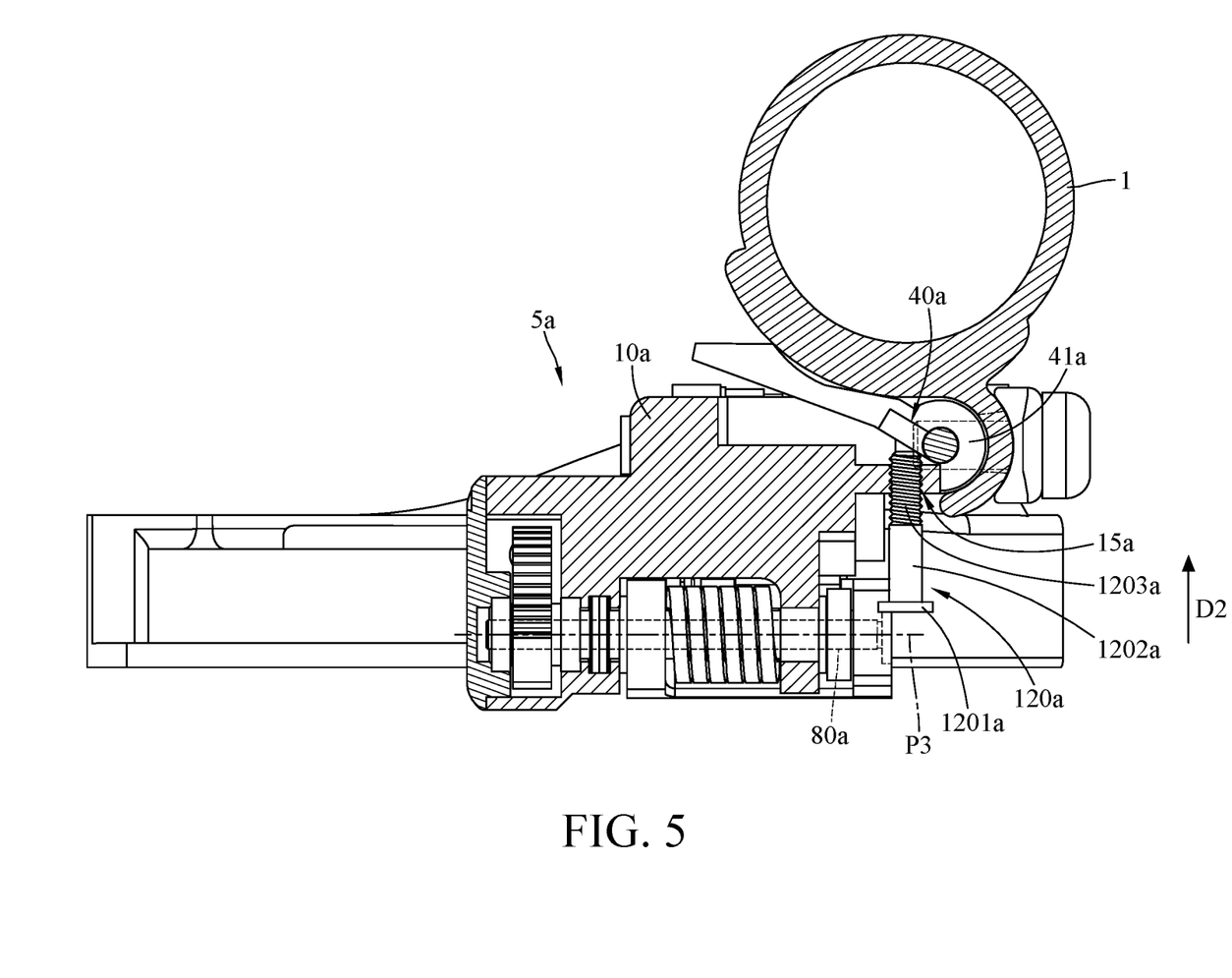
FIG. 5 is a cross-sectional view of a bicycle front derailleur according to a second embodiment of the disclosure.

Then, referring to FIG. 5, there is shown a cross-sectional view of a bicycle front derailleur 5a according to a second embodiment of the disclosure.

In this embodiment, the bicycle front derailleur 5a is similar to the bicycle front derailleur 5 as shown in FIG. 1, therefore only the differences between this and previous embodiments will be described in detail in the following paragraphs.

In this embodiment, an activating component 120a is movable in a direction perpendicular to a central axis P3 of a pivot pin 80a. In addition, a screw hole 15a of a fixed component 10a corresponds to the adjustment component 40a. At least part of a body portion 1202a of the activating component 120a is screwed into a screw hole 15a of the fixed component 10a. One end of the body portion 1202a located away from a head portion 1201a of the activating component 120a is in contact with the adjustment component 40a.

Figure 6:
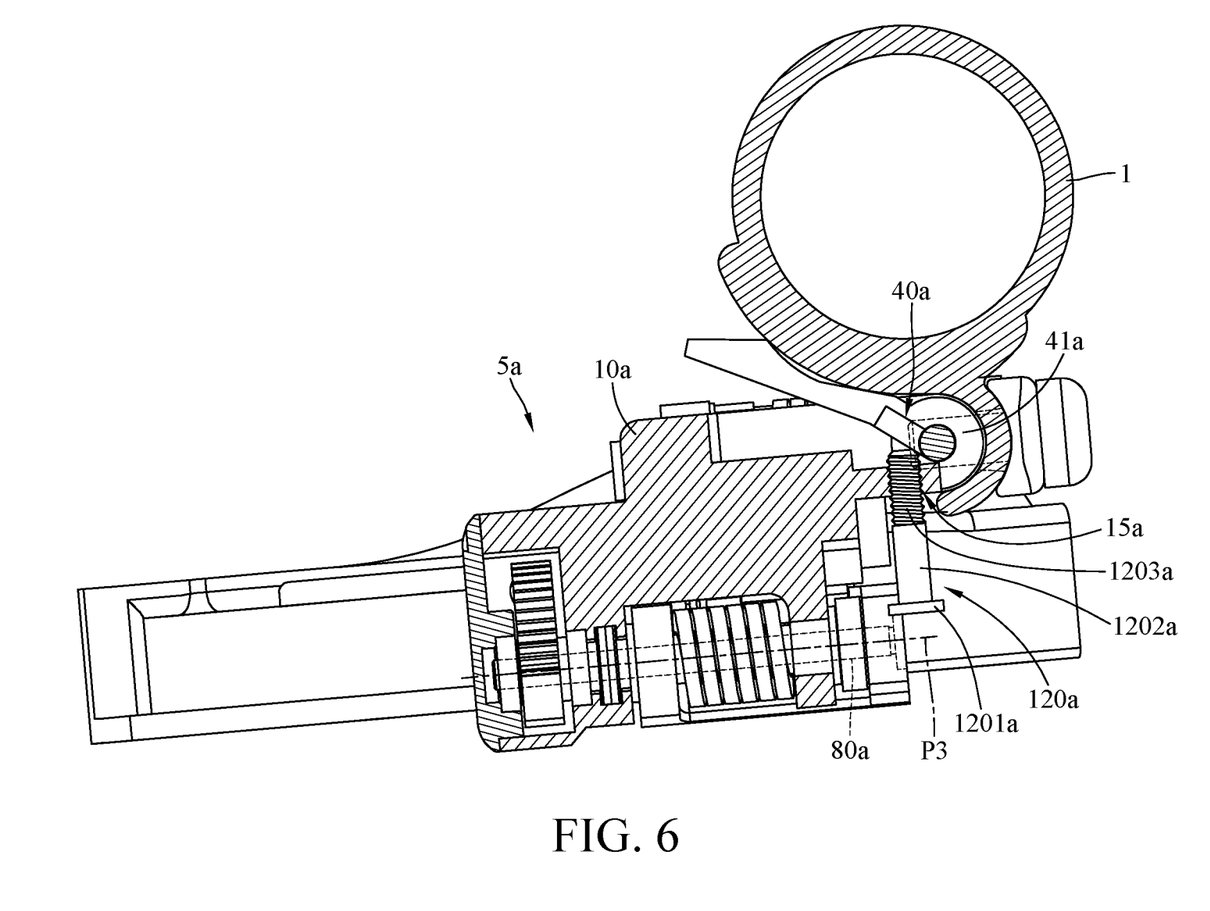
FIG. 6 is a cross-sectional view of the bicycle front derailleur in FIG. 5 when the position of the bicycle front derailleur has been adjusted.

Then, referring to FIG. 6, there is shown a cross-sectional view of the bicycle front derailleur 5a in FIG. 5 when the position of the bicycle front derailleur 5a has been adjusted. When the activating component 120a is moved in a direction D2, the body portion 1202a of the activating component 120a forces the adjustment component 40a to press against the frame 1. At this moment, when the activating component 120a is being screwed further through the screw hole 15a, the force that the activating component 120a acts on the fixed component 10a can cause the bicycle front derailleur 5 to pivot with respect to the frame 1, such that the fixed component 10a can be moved away from an end of the adjustment component 40a located away from the mount portion 41a, thereby slightly adjusted the position of the bicycle front derailleur 5 with respect to the frame 1.

In this embodiment, an elastic component (not shown), such as a torsion spring, a compression spring, or an extension spring, may be disposed on the adjustment component 40a to force the end of the adjustment component 40a located away from the mount portion 41a to move toward the fixed component 10a. As such, when the activating component 120a is screwed in the opposite direction so as to be gradually released from the screw hole 15a, the activating component 120a can cause the end of the adjustment component 40a located away from the mount portion 41a to move towards the fixed component 10a (e.g., in a counter-clockwise direction in FIG. 6) via the elastic component, such that the angle of the adjustment component 40a to the frame 1 can be adjusted, and the angle of the bicycle front derailleur 5a to the frame 1 can be reduced.

According to the bicycle front derailleurs as discussed above, the adjustment component is movably disposed on the fixed component, and the activating component can force the adjustment component to press against the bicycle frame, such that the bicycle front derailleur can be pivoted with respect to the bicycle frame so as to slightly adjust the position of the bicycle front derailleur, thereby ensuring a smooth shifting of the bicycle chain among the chainrings.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle front derailleur, configured to be mounted on a bicycle frame, comprising:
   a fixed component, configured to be mounted on the bicycle frame;
   a chain guide;
   a linkage assembly, wherein two opposite ends of the linkage assembly are respectively and pivotably disposed on the fixed component and the chain guide; and
   an adjustment component, pivotably disposed on the fixed component, wherein the adjustment component is configured to press against the bicycle frame so as to adjust a position of the bicycle front derailleur with respect to the bicycle frame.

2. The bicycle front derailleur according to claim 1, further comprising an activating component, wherein the activating component is in contact with the adjustment component, the activating component is movable with respect to the fixed component so as to force the adjustment component to press against the bicycle frame to adjust the position of the bicycle front derailleur with respect to the bicycle frame.

3. The bicycle front derailleur according to claim 2, wherein the activating component and the adjustment component are two independent objects.

4. The bicycle front derailleur according to claim 2, wherein the activating component is movable in a direction perpendicular to a pivot axis of the adjustment component.

5. The bicycle front derailleur according to claim 4, further comprising a plurality of pivot pins, wherein the two opposite ends of the linkage assembly are respectively and pivotably disposed on the fixed component and the chain guide via the plurality of pivot pins, and the activating component is movable in the direction parallel to central axes of the plurality of pivot pins.

6. The bicycle front derailleur according to claim 5, wherein the activating component includes a head portion and a body portion connected to each other, a width of the head portion is larger than a width of the body portion, the body portion has outer threads, the fixed component has a screw hole, the body portion is disposed through the adjustment component, the outer threads of the body portion are partially screwed into the screw hole, and the head portion is in contact with the adjustment component.

7. The bicycle front derailleur according to claim 6, further comprising an elastic component, wherein the elastic component is sleeved on the body portion of the activating component and in contact with the adjustment component so as to force the adjustment component to be in contact with the head portion of the activating component.

8. The bicycle front derailleur according to claim 4, further comprising a plurality of pivot pins, wherein the two opposite ends of the linkage assembly are respectively and pivotably disposed on the fixed component and the chain guide via the plurality of pivot pins, and the activating component is movable in the direction perpendicular to central axes of the plurality of pivot pins.

9. The bicycle front derailleur according to claim 8, wherein the activating component includes a head portion and a body portion connected to each other, a width of the head portion is larger than a width of the body portion, the body portion has outer threads, the fixed component has a screw hole, the screw hole corresponds to the adjustment component, the outer threads of the body portion are partially screwed into the screw hole, and an end of the body portion located away from the head portion is in contact with the adjustment component.

10. The bicycle front derailleur according to claim 1, wherein the fixed component has an inner surface and a recess, the inner surface is configured to face towards the bicycle frame, the recess is formed on the inner surface, and the adjustment component is partially located in the recess.

11. A bicycle front derailleur, configured to be mounted on a bicycle frame, comprising:
 a fixed component, configured to be mounted on the bicycle frame;
 a chain guide;
 a linkage assembly, wherein two opposite ends of the linkage assembly are respectively and pivotably disposed on the fixed component and the chain guide;
 an adjustment component, pivotably disposed on the fixed component, wherein the adjustment component is configured to press against the bicycle frame; and
 an activating component, wherein the activating component is in contact with the adjustment component, the activating component is movable with respect to the fixed component to pivot the adjustment component in one of two different directions so as to adjust a position of the bicycle front derailleur with respect to the bicycle frame.

12. The bicycle front derailleur according to claim 11, further comprising a plurality of pivot pins, wherein the two opposite ends of the linkage assembly are respectively and pivotably disposed on the fixed component and the chain guide via the plurality of pivot pins, and the activating component is movable in a direction parallel to central axes of the plurality of pivot pins.

13. The bicycle front derailleur according to claim 12, further comprising an elastic component, wherein the adjustment component a mount portion, a pushed portion, and a press portion, the mount portion is pivotably disposed on the fixed component, the pushed portion and the press portion are connected to the mount portion, the pushed portion and the press portion respective extend outwards in two different directions from the mount portion, the activating component is in contact with the pushed portion, the elastic component presses against the pushed portion so as to force the pushed portion to be in contact with the activating component.

14. The bicycle front derailleur according to claim 11, further comprising a plurality of pivot pins, wherein the two opposite ends of the linkage assembly are respectively and pivotably disposed on the fixed component and the chain guide via the plurality of pivot pins, and the activating component is movable in a direction perpendicular to central axes of the plurality of pivot pins.

15. The bicycle front derailleur according to claim 14, wherein the activating component includes a head portion and a body portion connected to each other, a width of the head portion is larger than a width of the body portion, the body portion has outer threads, the fixed component has a screw hole, the screw hole corresponds to the adjustment component, the outer threads of the body portion are partially screwed into the screw hole, and an end of the body portion located away from the head portion is in contact with the adjustment component.

* * * * *